Jan. 26, 1954
F. B. FISHBURNE ET AL
2,667,279
HOGSHEAD HANDLING APPARATUS
Filed Jan. 8, 1951
3 Sheets-Sheet 2
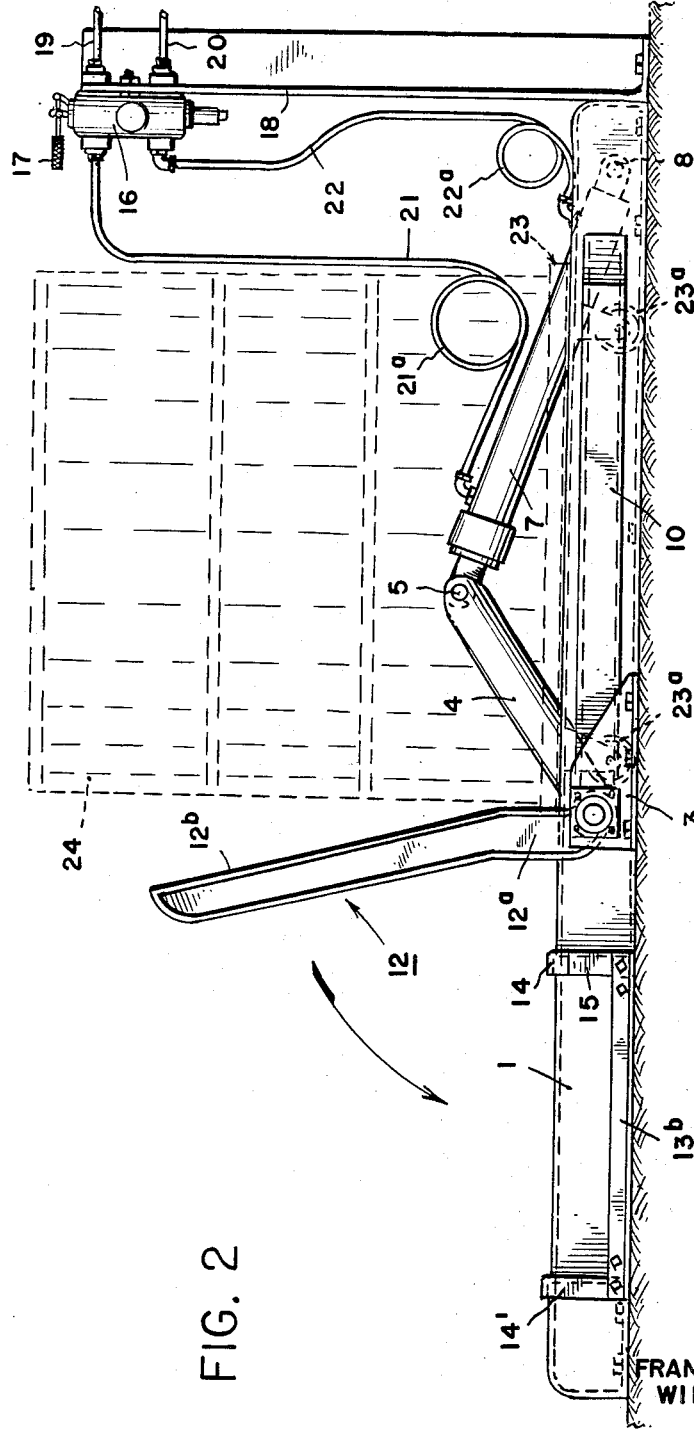
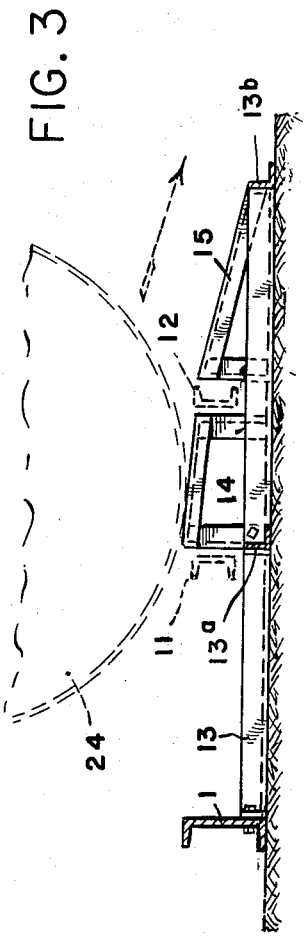
Inventors
FRANCIS B. FISHBURNE,
WILLIAM L. RICE,
By Stone, Boyden & Mack
Attorneys.

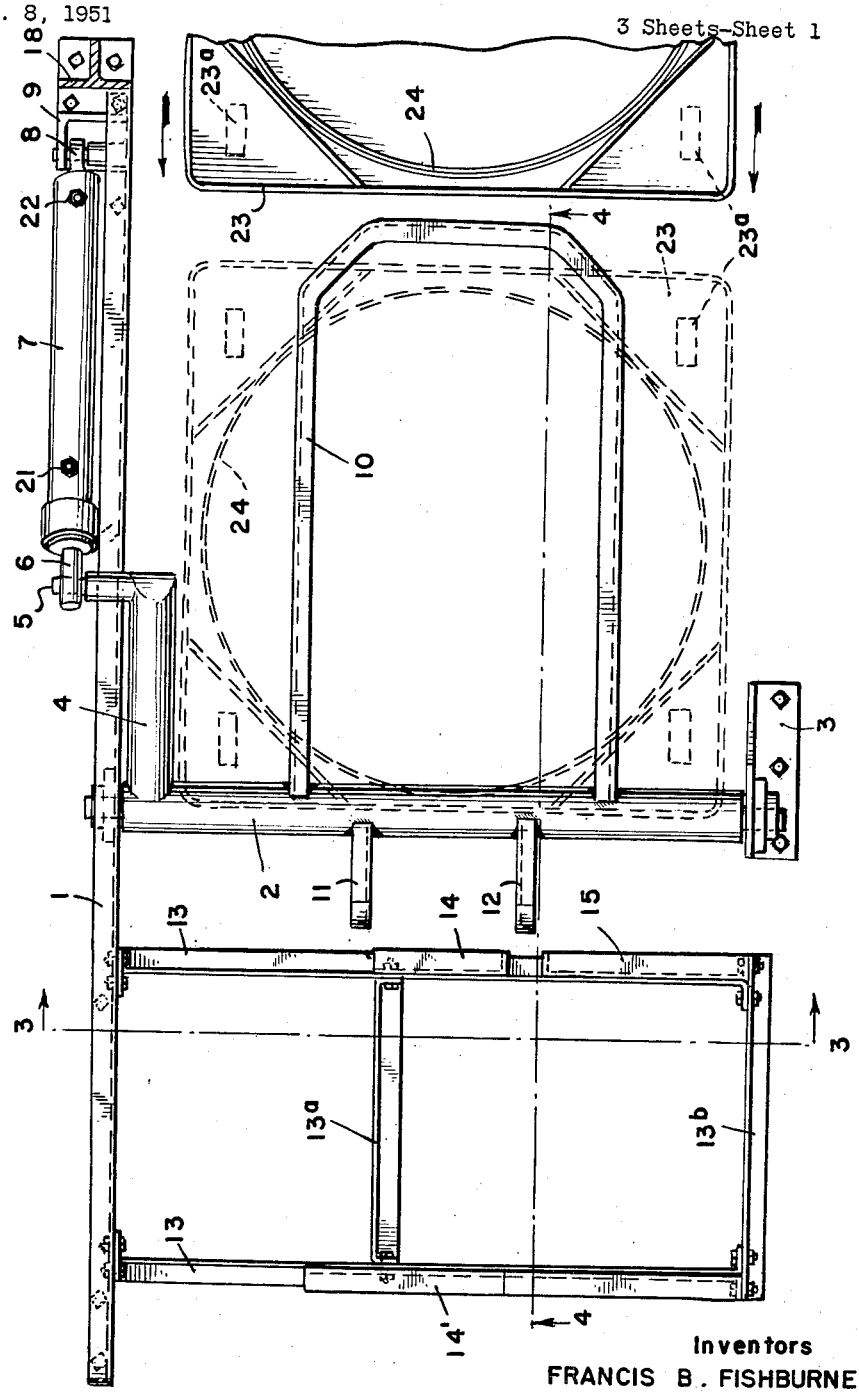

Patented Jan. 26, 1954

2,667,279

UNITED STATES PATENT OFFICE 2,667,279

HOGSHEAD HANDLING APPARATUS

Francis B. Fishburne and William L. Rice, Asheville, N. C.

Application January 8, 1951, Serial No. 204,968

4 Claims. (Cl. 214—38)

1

This invention relates to apparatus for handling barrels or hogsheads, and more particularly to apparatus for loading such containers on or unloading them from wheeled dollies such as are commonly employed for transporting goods around the floors of warehouses.

The invention is designed especially for handling hogsheads of tobacco, as these are large and heavy, and loading and unloading them by hand has presented a difficult problem.

The general object of the invention is to devise power operated apparatus, constructed for installation on a warehouse floor, for removing hogsheads from or placing them on the usual dollies.

A more specific object is to provide simple and efficient hydraulically operated apparatus of this character, employing, to a large extent, standard parts and equipment, and requiring only a few specially constructed parts, so that the cost of manufacture is relatively low.

In order that the invention may be readily understood, reference is had to the accompanying drawings, forming part of this specification, and in which:

Fig. 1 is a plan view of our complete apparatus, parts being in section;

Fig. 2 is a side elevation of the parts when in the position illustrated in Fig. 1;

Fig. 3 is a transverse section substantially on the line 3—3 of Fig. 1 looking in the direction of the arrows, the hogshead being illustrated in dotted lines in a position corresponding to that of Fig. 4.

Figure 4:
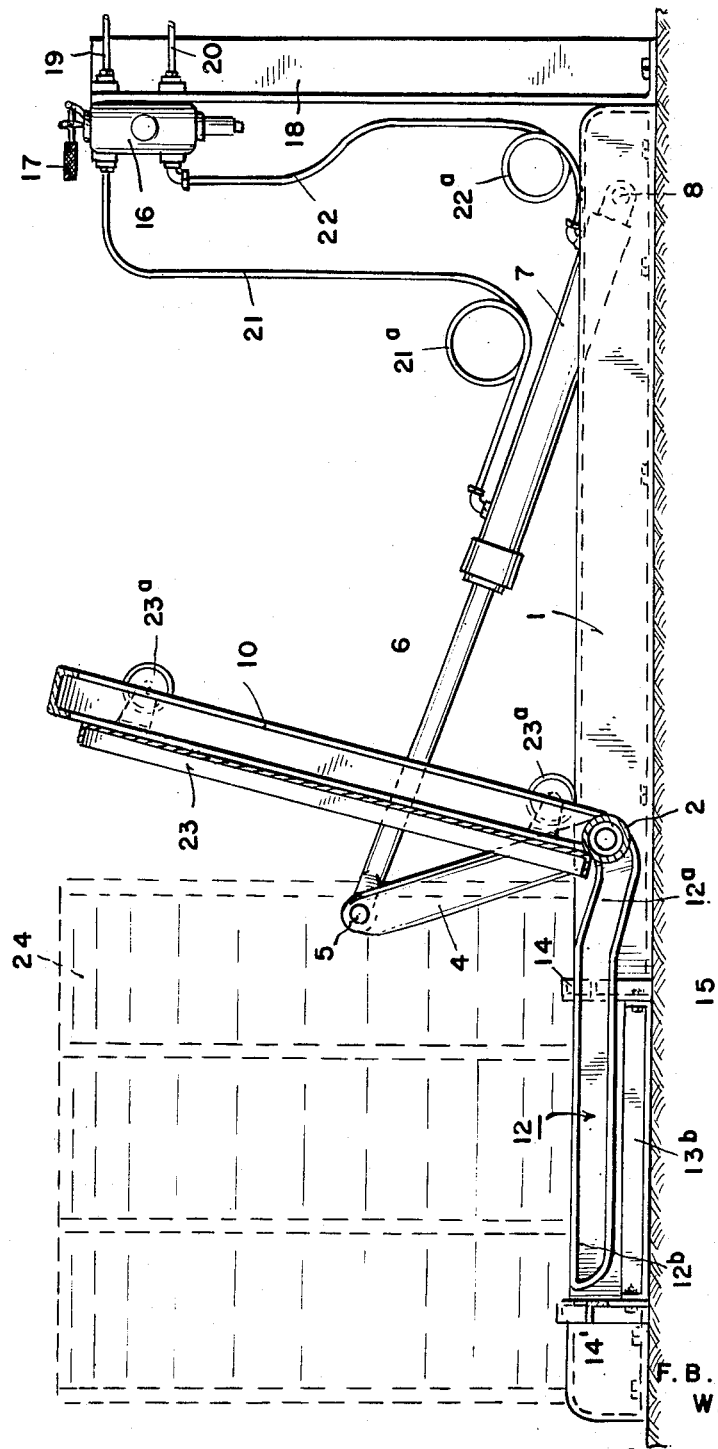
Fig. 4 is a vertical, longitudinal section substantially on the line 4—4 of Fig. 1.

Referring to the drawings in detail, our improved apparatus comprises a beam or sill 1 which may be in the nature of a channel beam. In the beam is journalled, at a point intermediate its length, one end of a shaft or torque tube 2, the other end of which is journalled in a bracket 3 secured to the floor on which the beam 1 rests.

Secured, as by welding, to one end of the shaft or torque tube 2 is a torque arm 4, carrying at its free end a crank pin 5 to which is pivotally connected a piston rod 6 carrying a piston (not shown), working in a hydraulic cylinder 7, pivotally mounted at its other end on a bracket 9 as indicated at 8.

Firmly fixed to the torque tube 2, as by welding, is one end of a flat, radially extending frame 10, shown as U-shaped in form.

Also rigidly fixed to the torque tube 2, preferably at a point between the legs of the frame 10, are a pair of parallel spaced, radially extending arms 11 and 12, constituting a second frame. These arms comprise portions 11ᵃ and 12ᵃ disposed at substantial right angles to the plane of the frame 10, and end portions 11 and 12 disposed in a somewhat inclined position, as shown in Fig. 2, so that they extend at an obtuse angle to the plane of the frame 10.

Secured to the beam 1 at a point near the end, opposite to the pivot 8, and extending parallel with the torque tube or shaft 2, is a ramp structure comprising a pair of parallel rails 13 resting on the floor and connected at the middle and ends by tie bars 13ᵃ and 13ᵇ. Supported on the rails 13 by suitable struts are a pair of inclined rails 14 and 15 disposed in the same vertical plane, as shown in Fig. 1, at one side of the ramp, and a parallel rail 14' disposed at the other side of the ramp.

By reference to Figs. 1 and 3, it will be particularly noted that a space is provided between the adjacent ends of the rails 14 and 15 to receive the arm 12, while the rail 14 terminates short of the plane of movement of the arm 11. Therefore, the arms 11 and 12 can freely occupy the position illustrated in dotted lines in Fig. 3 in which they are below or substantially flush with the top of the rails 14 and 15.

In order to control the movement of the piston in cylinder 7, we provide a four-way manually actuated valve 16, having an operating handle 17, and mounted upon a suitable support 18 at a convenient height above the floor. A motive fluid supply pipe 19 and an exhaust pipe 20 connect with the valve 16 in the usual manner, and pipes 21 and 22 extend from this valve to the opposite ends of the cylinder 7. These pipes are preferably formed with loops 21ᵃ and 22ᵃ so that they may yield as the cylinder swings upon its pivot.

The four-way valve 16 may be of conventional or standard form, and in some cases the supply pipe 19 may be connected with the city water supply. If the pressure of the city water is not sufficient, however, a suitable pump and tank (not shown) are employed to supply fluid under the desired pressure to the pipe 19.

A dolly of the usual or any desired form is shown at 23 in full lines in Fig. 4, in dotted lines in Fig. 3 and in both full and dotted lines in Fig. 1. It is illustrated as provided with the customary four wheels or rollers 23ᵃ, one near each corner. Referring to Figs. 1 and 3, it will be seen that the frame 10 is of such size and height that the dolly may roll freely over it with the wheels straddling it.

Let it be assumed that a hogshead 24 is resting on a dolly 23 and that it is desired to unload or remove this hogshead from the dolly. With the parts in the position shown in Figs. 1 and 3, the dolly is rolled into the position shown in dotted lines in Fig. 1 in which it overlies the frame 10, with the wheels straddling such frame. Motive fluid is then admitted through pipe 22 to the lower end of cylinder 7 so as to force the piston rod 6 outwardly and rock the shaft 2 upon its bearings. The initial rocking movement tilts the frame 10, together with the dolly and hogshead, upwardly into an inclined position. During this initial movement, the hogshead rests against the vertical portions 11a and 12a of the arms 11 and 12, as shown in Fig. 2. As the rocking movement of the shaft 2 continues, however, the hogshead reaches a point where it tips over and lies with its sides against the end portions 11b and 12b of the arms. These act as stops to catch and hold the hogshead as it tips over and leaves the dolly. The rocking movement of the shaft continues until the arms 11 and 12 reach the final horizontal position shown in Figs. 3 and 4, but in which position the dolly is still supported on the frame 10. As the arms approach that horizontal position, the hogshead is deposited on the ramp rails 14, 14' and, when the arms move below these ramp rails, the hogshead rolls down the ramp out onto the warehouse floor, as indicated by the arrow in Fig. 3.

When it is desired to load a hogshead upon a dolly, the reverse operation takes place. The arms 11 and 12 are first moved into the position shown in Figs. 3 and 4, and a dolly is placed upon the frame 10 in the position shown in Fig. 4. A hogshead is then rolled up the ramp into the position illustrated in dotted lines in Fig. 3. Thereupon, motive fluid is admitted through pipe 21 into the upper end of the cylinder 7 so as to force the piston inwardly and rotate the shaft 2 and the arms 11 and 12 in a clockwise direction, as viewed in Fig. 4. When this rocking movement has progressed far enough, the hogshead tilts back with its end resting against the dolly. The rocking movement is continued until the frame 10 reaches a horizontal position in which the wheels of the dolly rest upon the floor. The dolly and hogshead may then be rolled away.

From the foregoing it will be seen that our improved apparatus may be said to comprise a cradle made up of two frames disposed at an angle to each other and rigidly secured to the rock shaft, this rock shaft constituting the junction point of the two frames. Also, that either of these frames, as desired, may be brought into a horizontal position and that the rocking movement of the cradle causes the hogshead to tip over on its side or tip back upon its end as the case may be.

It will further be understood that the hydraulic cylinder and control valve may be commercially available, standard equipment, so that the cradle and ramp are the only things which have to be specially constructed.

What we claim is:

1. Apparatus of the character described comprising a cradle made up of two rigidly connected frames, one of said frames having a portion adjacent the junction point of the frames disposed at substantial right angles to the other frame, and an end portion disposed at an obtuse angle thereto, and power means for rocking said cradle about the junction point of said frames so as to bring either said end portion of the first mentioned frame or the other frame in its entirety into horizontal position.

2. Apparatus for unloading a hogshead from a dolly adapted to support the same on a floor, comprising a horizontal rock shaft, a flat frame rigidly carried by said shaft substantially in the plane thereof and capable of lying in a horizontal plane adjacent the floor, said frame being of such size and thickness that the dolly may be rolled into position over it with the dolly wheels straddling said frame while resting wholly on the floor, power means for rocking said shaft so as to tilt said frame and dolly into such an inclined position that the hogshead tips over on its side, leaving the dolly supported on said frame, and stop means also carried by said shaft for catching the hogshead as it tips over, said power means being constructed to effect a further movement of said shaft to lower said catching means until the side of the hogshead reaches a substantially horizontal position.

3. Apparatus for handling hogsheads comprising means for lifting a hogshead when in vertical position and tilting it until it tips over on its side, means including a frame having a pair of spaced members for catching and supporting in inclined position the hogshead so tipped, means for moving said frame until it and the hogshead carried thereby reach a substantially horizontal position, and a ramp extending transversely across the path of movement of said members and having a portion located between the same, on which portion, when such horizontal position is reached, the hogshead is deposited from said frame, and down which it will roll by gravity.

4. Apparatus for handling hogsheads on a warehouse floor comprising a sill adapted to be supported on the floor, a horizontal rockshaft journalled at one end in said sill adjacent the floor, a cradle comprising a pair of rigidly connected, angularly disposed frames, a rockshaft on which said cradle is mounted at the junction point of said frames, means carried by said sill for rocking said shaft so as to bring either of said frames into horizontal position, as desired, means for loading a hogshead on to one of said frames, when in horizontal position, and a ramp supported on the floor, on to which ramp the hogshead is deposited by the movement of the other of said rigid frames to horizontal position.

FRANCIS B. FISHBURNE.
WILLIAM L. RICE.

References Cited in the file of this patent

UNITED STATES PATENTS

| Number | Name | Date |
|---|---|---|
| 1,548,557 | Shipley | Aug. 4, 1925 |
| 1,644,386 | Kendall | Oct. 4, 1927 |
| 2,092,539 | Talbot | Sept. 7, 1937 |
| 2,101,738 | Gotthardt | Dec. 7, 1937 |
| 2,232,045 | Berthold et al. | Feb. 18, 1941 |
| 2,251,731 | Daniels | Aug. 5, 1941 |
| 2,260,697 | Allen | Oct. 28, 1941 |
| 2,426,569 | Stewart | Aug. 26, 1947 |